United States Patent
Hatanaka

(10) Patent No.: US 9,731,616 B2
(45) Date of Patent: Aug. 15, 2017

(54) RAILWAY VEHICLE SYSTEM

(75) Inventor: Keita Hatanaka, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 535 days.

(21) Appl. No.: 14/385,833

(22) PCT Filed: Mar. 28, 2012

(86) PCT No.: PCT/JP2012/058250
§ 371 (c)(1),
(2), (4) Date: Sep. 17, 2014

(87) PCT Pub. No.: WO2013/145191
PCT Pub. Date: Oct. 3, 2013

(65) Prior Publication Data
US 2015/0115703 A1    Apr. 30, 2015

(51) Int. Cl.
*B60L 1/00* (2006.01)
*B60L 3/00* (2006.01)
(Continued)

(52) U.S. Cl.
CPC ............ *B60L 11/1851* (2013.01); *B60L 1/00* (2013.01); *B60L 3/0046* (2013.01); *B60L 3/04* (2013.01);
(Continued)

(58) Field of Classification Search
CPC .. B61C 3/00; B61C 7/04; B61C 17/00; B60R 16/04; H02P 7/06; B60K 6/46; B60K 6/32; H02J 4/00
(Continued)

(56) References Cited

U.S. PATENT DOCUMENTS 7,237,492 B2    7/2007  Inarida
2005/0235865 A1* 10/2005  Kumar .................... B60L 9/16
                                                           105/61
(Continued)

FOREIGN PATENT DOCUMENTS

EP    1555185 A1    7/2005
EP    2 424 070 A2  2/2012
(Continued)

OTHER PUBLICATIONS

Extended European Search Report dated Sep. 9, 2015, issued in corresponding European Patent Application No. 12873395.3 (6 pages).
(Continued)

*Primary Examiner* — Rexford Barnie
*Assistant Examiner* — Jagdeep Dhillon
(74) *Attorney, Agent, or Firm* — Buchanan Ingersoll & Rooney PC

(57) ABSTRACT

An electric locomotive includes a first control line and DC buses laid between couplers, a power storage device connected to the DC buses, and a DC/DC converter that executes charge and discharge control with respect to the power storage device. A non-powered vehicle includes DC buses connected to the DC buses via a coupler, a second control line, a power storage device connected to the DC buses via a circuit breaker, and a BMU that manages the power storage device. The DC/DC converter executes power accumulation control with respect to the power storage device and power accumulation control with respect to the power storage device. When having determined abnormality of the power storage device, the BMU controls the circuit breaker to be turned off, thereby cutting off electrical connection between the power storage device and the DC buses.

3 Claims, 6 Drawing Sheets

(51) Int. Cl.
*H02G 3/00* (2006.01)
*B60L 11/18* (2006.01)
*B61C 3/00* (2006.01)
*B61C 3/02* (2006.01)
*B60L 3/04* (2006.01)
*B60L 7/14* (2006.01)
*B60L 7/26* (2006.01)
*B60L 9/22* (2006.01)
*B60L 9/00* (2006.01)
*B60L 15/32* (2006.01)
*B60L 15/36* (2006.01)
*B60L 15/42* (2006.01)

(52) U.S. Cl.
CPC ...... *B60L 7/14* (2013.01); *B60L 7/26* (2013.01); *B60L 9/00* (2013.01); *B60L 9/22* (2013.01); *B60L 11/1801* (2013.01); *B60L 11/1803* (2013.01); *B60L 11/1859* (2013.01); *B60L 11/1861* (2013.01); *B60L 11/1864* (2013.01); *B60L 11/1866* (2013.01); *B60L 11/1868* (2013.01); *B60L 15/32* (2013.01); *B60L 15/36* (2013.01); *B60L 15/42* (2013.01); *B61C 3/00* (2013.01); *B61C 3/02* (2013.01); *B60L 2200/26* (2013.01); *B60L 2210/10* (2013.01); *B60L 2240/12* (2013.01); *B60L 2240/545* (2013.01); *B60L 2240/547* (2013.01); *B60L 2240/549* (2013.01); *Y02T 10/7005* (2013.01); *Y02T 10/7044* (2013.01); *Y02T 10/7061* (2013.01); *Y02T 10/7066* (2013.01); *Y02T 10/7216* (2013.01); *Y02T 30/12* (2013.01)

(58) Field of Classification Search
USPC ...... 307/9.1, 10.1, 24, 65, 81; 701/29, 19, 1; 324/429; 320/134, 109, 138, 103; 318/376, 139, 521; 702/183
See application file for complete search history.

(56) References Cited

U.S. PATENT DOCUMENTS

| | | | | |
|---|---|---|---|---|
| 2006/0005739 | A1* | 1/2006 | Kumar | B60L 7/06 105/35 |
| 2007/0137514 | A1* | 6/2007 | Kumar | B61L 3/006 105/26.05 |
| 2008/0276825 | A1* | 11/2008 | King | B60L 3/0046 105/50 |
| 2008/0281479 | A1* | 11/2008 | King | B60L 11/123 701/22 |
| 2008/0288192 | A1* | 11/2008 | Kumar | B60L 7/18 702/60 |
| 2009/0038500 | A1* | 2/2009 | Bhardwaj | B60L 11/1864 105/26.05 |
| 2009/0125170 | A1* | 5/2009 | Noffsinger | B60L 7/16 701/20 |
| 2009/0187291 | A1* | 7/2009 | Daum | B61L 3/006 701/2 |
| 2009/0234521 | A1* | 9/2009 | Kumar | B60L 11/1851 701/19 |
| 2010/0264731 | A1* | 10/2010 | Arimilli | H02J 1/102 307/24 |
| 2012/0319653 | A1* | 12/2012 | Kumar | H02J 7/0013 320/118 |

FOREIGN PATENT DOCUMENTS

| | | |
|---|---|---|
| EP | 2423066 A2 | 2/2012 |
| JP | 10-123225 A | 5/1998 |
| JP | 2005-027447 A | 1/2005 |
| JP | 2006-69510 A | 3/2006 |
| JP | 2008-029149 A | 2/2008 |
| JP | 2008-226511 A | 9/2008 |
| JP | 2008-263741 A | 10/2008 |
| JP | 2012-050213 A | 3/2012 |

OTHER PUBLICATIONS

International Search Report (PCT/ISA/210) mailed on May 1, 2012, by the Japanese Patent Office as the International Searching Authority for International Application No. PCT/JP2012/058250.
Written Opinion (PCT/ISA/237) mailed on May 1, 2012, by the Japanese Patent Office as the International Searching Authority for International Application No. PCT/JP2012/058250.
Japanese Office Action dated Oct. 23, 2012 for Japanese Application No. 2012-540221 (with English language translation, pp. 1-4).
Japanese Office Action dated Jan. 22, 2013 for Japanese Application No. 2012-540221 (with English language translation, pp. 1-5).
Office Action (Invitation Pursuant to Article 94(3) and Rule 71(1) EPC) issued on May 13, 2016, by the European Patent Office in corresponding European Patent Application No. 12 873 395.3-1807. (3 pages).

* cited by examiner

RAILWAY VEHICLE SYSTEM

FIELD

The present invention relates to a railway vehicle system including a power storage device.

BACKGROUND

As a railway vehicle system including a power storage device, for example, Patent Literature 1 describes a railway vehicle drive system including a power management unit that controls power generated by a power generation unit and a power accumulation amount of a power accumulation unit as a power storage device, wherein the power accumulation unit accumulates power generated by the power generation unit and regenerative power, and a drive motor is driven by a power conversion unit by using the power generation unit and the power accumulation unit as a power source, to drive a train.

CITATION LIST

Patent Literature

Patent Literature 1: Japanese Patent Application Laid-open No. 2005-27447

SUMMARY

Technical Problem

However, in the railway vehicle system described in Patent Literature 1 mentioned above, characteristics variability between the power storage devices is not taken into consideration. Therefore, in the railway vehicle system described in Patent Literature 1, it is assumed to use a single type of power storage device, and thus there is a problem that it is not possible or it is difficult to connect power storage devices having different characteristics with each other. This also leads to a problem such that there is a considerable limitation in unifying the vehicles at the time of composing a train.

The present invention has been achieved in view of the above problems, and an object of the present invention is to provide a railway vehicle system that can simultaneously use power storage devices having different characteristics and alleviate the limitation in unifying the vehicles at the time of composing a train.

Solution to Problem

The present invention is directed to a railway vehicle system that achieves the object. The railway vehicle system includes at least one powered vehicle having a drive motor and at least one non-powered vehicle. At least one powered vehicle includes first power lines having positive and negative DC terminals and laid between one coupler and the other coupler, the couplers being provided at each end of each powered vehicle; a first power storage device connected to the first power lines; a first battery management unit that manages the first power storage device; and a first DC/DC converter that executes charge and discharge control with respect to the first power storage device. At least one non-powered vehicle includes second power lines connected to the first power lines via the coupler; a second power storage device connected to the second power lines via a circuit breaker; a second battery management unit that manages the second power storage device; and a second DC/DC converter that individually executes charge and discharge control with respect to the second power storage device.

Advantageous Effects of Invention

According to the present invention, power storage devices having different characteristics can be used in a train in one formation, which leads to alleviation of the limitation in train formation.

DESCRIPTION OF EMBODIMENTS

Exemplary embodiments of a railway vehicle system according to the present invention will be explained below in detail with reference to the accompanying drawings. The present invention is not limited to the embodiments.

First Embodiment

Figure 1:
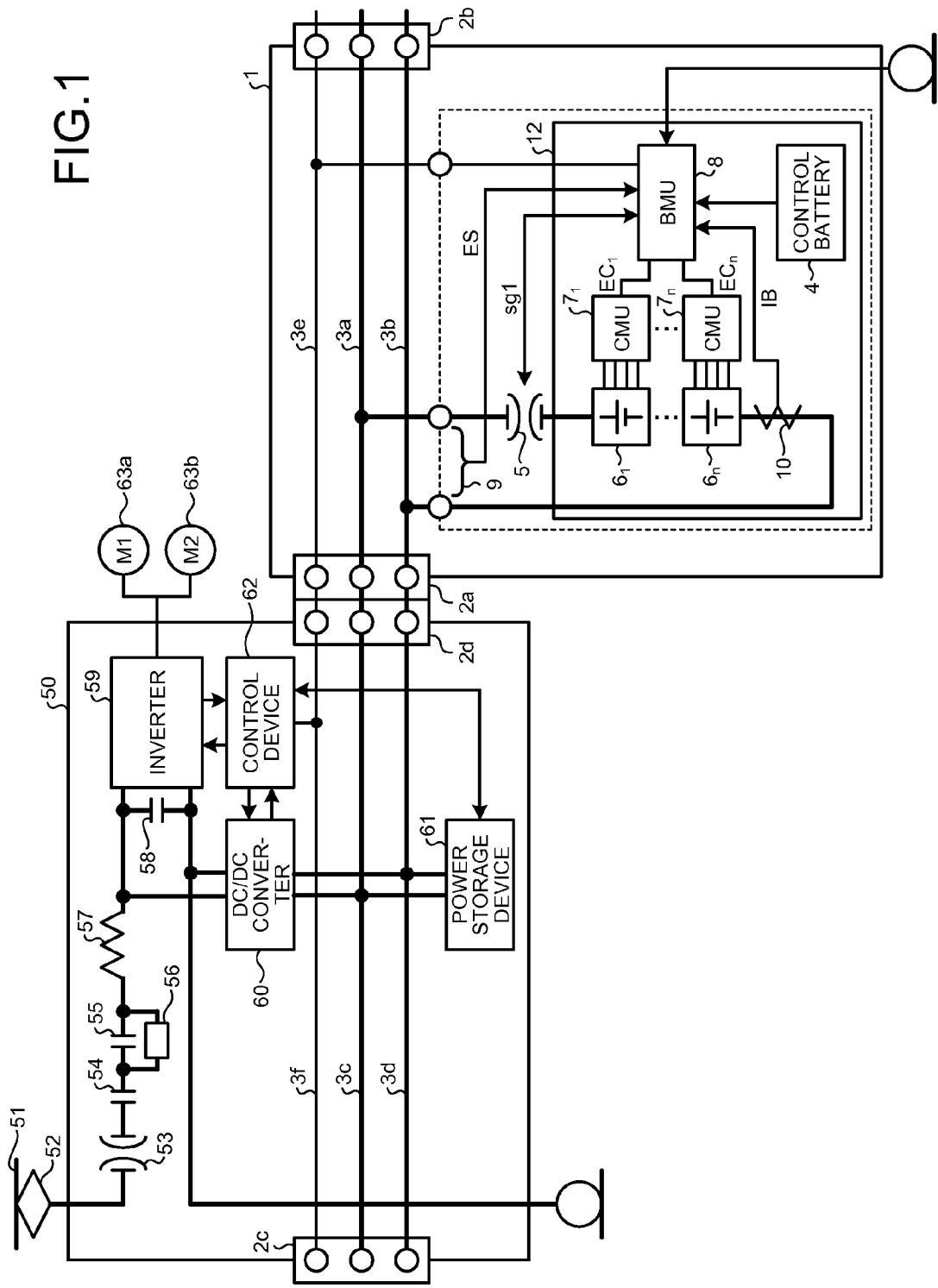
FIG. 1 shows a configuration example of a railway vehicle system according to a first embodiment.

FIG. 1 shows a configuration example of a railway vehicle system according to a first embodiment of the present invention. As shown in FIG. 1, the railway vehicle system according to the first embodiment is mounted with a power storage device 61 as a first power storage device, and includes an electric locomotive 50 as a powered vehicle including a drive control unit such as an inverter 59, a DC/DC converter 60 as a first DC/DC converter, a control device 62, and a drive motor 63, and a non-powered vehicle (for example, a freight vehicle) 1 mounted with a power storage device 12 as a second power storage device.

The electric locomotive 50 receives DC power from an electric power substation, which is a power supply source (not shown), via a DC overhead-contact line 51 and a pantograph 52, and converts DC power supplied via a circuit breaker 53, a first line breaker 54, a second line breaker 55, a charging resistor 56, a filter reactor 57, and a filter capacitor 58 to AC power in the inverter 59 to drive the drive motors 63 (63a and 63b).

The DC/DC converter 60 is connected to the filter capacitor 58 in parallel. The DC/DC converter 60 charges the power storage device 61 by using DC power from the DC overhead-contact line 51 or regenerative power from the drive motor 63. When a circuit breaker 5 of the non-powered vehicle 1 is controlled to be on, an output of the DC/DC converter 60 is also transmitted to DC buses 3a and 3b, to charge the power storage device 12. That is, the DC/DC converter 60 also executes charge and discharge control with respect to not only the power storage device 61 but also the power storage device 12.

The DC/DC converter 60 discharges DC power of the power storage device 61 and supplies the DC power to the inverter 59 in order to drive the drive motor 63. The inverter 59 converts the supplied DC power to AC power to control the drive motor 63, and applies a drive force to the electric locomotive 50.

A coupler 2 (2c and 2d) including a DC terminal and a control terminal is provided respectively at opposite ends of the electric locomotive 50. DC buses 3c and 3d as first power lines for transmitting and receiving DC power, and a first control line 3f connected with the control device 62 are laid between the couplers 2c and 2d. The power storage device 61 mounted on the electric locomotive 50 is connected to the DC buses 3c and 3d.

The coupler 2 (2c and 2d) includes positive and negative DC terminals for transmitting and receiving DC power to and from a normal coupler and a control terminal that transmits and receives a control signal to and from the control device 62. However, these positive and negative DC terminals and the control terminal can be provided separately from the normal coupler (a coupler that mechanically couples vehicles). As for the DC buses 3c and 3d, it is desired that the positive-side DC bus 3c and the negative-side DC bus 3d are arranged as close as possible, so that wiring inductance and wiring resistance are reduced.

The non-powered vehicle 1 is explained next. A coupler 2 (2a, 2b) is also respectively provided at opposite ends of the non-powered vehicle 1. The DC buses 3a and 3b as second power lines electrically connected to each of the DC buses 3c and 3d and a second control line 3e connected to the first control line 3f are provided between these couplers 2a and 2b via the couplers between the vehicles (the couplers 2d and 2a in the example shown in FIG. 1). The power storage device 12 mounted on the non-powered vehicle 1 is connected to the DC buses 3a and 3b via the circuit breaker 5. As for the DC buses 3a and 3b, it is desired that the positive-side DC bus 3a and the negative-side DC bus 3b are arranged as close as possible, so that wiring inductance and wiring resistance are reduced as in the DC buses 3c and 3d.

The power storage device 12 is a battery device that can charge and discharge DC power, in which a plurality of battery modules 6 ($6_1$, ..., and $6_n$) are connected in series and in parallel. CMUs (cell monitor units) 7 ($7_1$, ..., and $7_n$) are provided in the respective battery modules 6. The CMU 7 detects a voltage of each cell that constitutes the battery module 6 and a temperature of the battery module 6. Pieces of information of the cell voltage and the module temperature detected by each CMU 7 are collected in a BMU (battery management unit) 8. The power storage device 61 is also configured by a circuit breaker, a battery module, a CMU, a BMU, and the like (all not shown) as in the power storage device 12.

The BMU 8 is connected to the second control line 3e between the couplers 2a and 2b. The BMU 8 operates by using, for example, a control battery 4 as a power source, to perform various protection operations (protection from overcharge, overdischarge, overcurrent, and overtemperature, and handling of CMU abnormality, BMU abnormality, and the like), and estimates the cell state (SOC (State of Charge), SOH (State of Health), internal resistance, and the like), thereby managing the power storage device 12. The BMU 8 can use the DC buses 3a and 3b or the battery module 6 as the power source. A voltage between the DC buses 3a and 3b between the couplers 2a and 2b is detected by a voltage detector 9, and the detected voltage is transmitted to the BMU 8 as a DC bus voltage ES. A charge and discharge current IB of the power storage device 12 is detected by a current detector 10 and transmitted to the BMU 8. The various protection operations and the operation of the circuit breaker 5 can be performed by fetching a speed signal from a speed detector (not shown) attached to a wheel of the non-powered vehicle 1.

In FIG. 1, the circuit breaker 5 and the voltage detector 9 are shown as external constituent elements of the power storage device 12. However, the circuit breaker 5 and the voltage detector 9 can of course be constituted as the constituent elements of the power storage device 12 as shown by a broken line in FIG. 1.

An operation of the railway vehicle system according to the first embodiment is explained next. A voltage between the DC buses 3a and 3b detected by the voltage detector 9 is transmitted to the BMU 8 as the DC bus voltage ES. The cell voltage of each battery module 6 detected by each CMU 7 is transmitted to the BMU 8 as cell voltages $EC_1$ to $EC_n$. The BMU 8 calculates a total voltage ES of the power storage device 12 by using, for example, an equation below based on the DC bus voltage ES and the cell voltages $EC_1$ to $EC_n$. A voltage detector can be separately provided to detect the total voltage EB of the power storage device 12.

$$EB = EC_1 + EC_2 + \ldots + EC_n \tag{1}$$

When a difference between the DC bus voltage ES and the total voltage EB of the power storage device 12 is within a predetermined value, the BMU 8 determines that the power storage device 12 can be connected between the DC buses 3a and 3b, and sends a command signal sg1 for turning on the circuit breaker 5 to the circuit breaker 5. When the circuit breaker 5 is turned on, the power storage device 12 is electrically connected between the DC buses 3a and 3b. At this time, the charge and discharge current IB flows to the power storage device 12 so that the difference between the DC bus voltage ES and the total voltage EB of the power storage device 12 becomes zero.

Meanwhile, when having determined abnormality of the power storage device 12 or the battery module 6 based on the information such as the respective cell voltages, temperatures of the respective battery modules 6, the SOC, and the SOH, the BMU 8 sends a command signal sg1 for turning off the circuit breaker 5 to the circuit breaker 5. When a part of the cell voltages exceeds a predetermined value or a part of the cell voltages decreases to be lower than the predetermined value, the BMU 8 can determine that there is an overvoltage or a low voltage to determine that the battery module 6 is abnormal. Also when the variability of the voltage between the cells exceeds the predetermined value, the BMU 8 can determine that there is an unbalance between cells to determine that the battery module 6 is abnormal. When the circuit breaker 5 is turned off, the charge and discharge current IB of the power storage device 12 does not flow.

When the charge and discharge current IB detected by the current detector 10 is larger than a predetermined value, the BMU 8 sends the command signal sg1 for turning off the circuit breaker 5 to the circuit breaker 5.

In this manner, in the railway vehicle system according to the first embodiment, abnormality of the power storage device and abnormality of the respective battery modules and the respective cells constituting the power storage device are determined. When abnormality is detected, the railway vehicle system executes control to cut off the power storage device including the battery module having abnormality from the DC buses.

Figure 2:
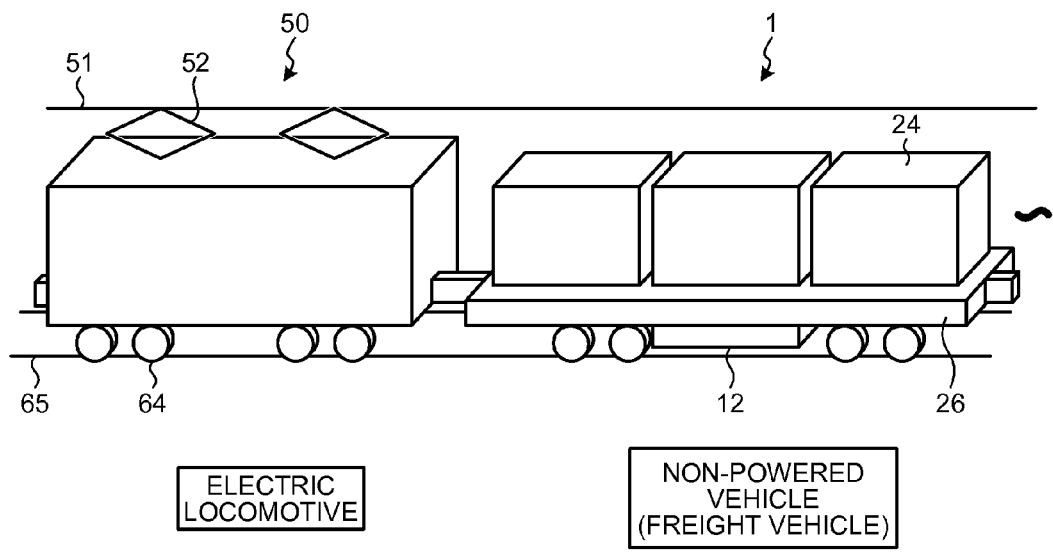
FIG. 2 is an image diagram showing a non-powered vehicle mounted with a power storage device and towed by an electric locomotive.

FIG. 2 is an image diagram showing the non-powered vehicle 1 mounted with the power storage device 12 and towed by the electric locomotive 50. As shown in FIG. 2, the power storage device 12 can be mounted on a downside (so-called, "under floor part") of a carriage platform 26 on which cargoes 24 are mounted. According to this mounting structure, the upside of the carriage platform 26 can be used as a normal freight vehicle. When the power storage device 12 has a container shape, the power storage device 12 can be mounted on a container vehicle. In any structure thereof, a vehicle mounted with the power storage device 12 is useful for being used as a freight vehicle that is charged at a certain point and thereafter moved to another point and used as a power source, that is, as a movable (mobile) power storage source, or as a power storage source in case of emergency. When the power storage device 12 has a container shape, the power storage device 12 can be transferred onto a truck in a freight terminal and directly delivered to a point of power demand.

In FIGS. 1 and 2, a case where one electric locomotive 50 and one non-powered vehicle 1 are used has been explained as an example. However, the number of the electric locomotives 50 and the non-powered vehicles 1 are arbitrary. In this case, the electric locomotive 50 can be provided before or after the non-powered vehicle 1 or in between. The number of vehicles can be increased or decreased at a station or the like on the way. For example, before and after a section having a large difference in height, the non-powered vehicle 1 in a sufficiently charged state can be added before an ascending section to assist power running, and regenerative power can be charged to the non-powered vehicle 1 in a descending section and released after the end of the descending section. Therefore, there is a case where the non-powered vehicle 1 is loaded only with the power storage device without having any cargoes or passengers. By increasing the number of the non-powered vehicles 1, a battery capacity sufficient for power running of the train and/or for absorbing regenerative power can be ensured.

In FIGS. 1 and 2, the non-powered vehicle 1 mounted with the power storage device 12 is shown. However, the non-powered vehicle 1 not mounted with the power storage device 12 can be included.

Even when the non-powered vehicle 1 is not mounted with the power storage device 12, the second control line 3e, and the DC buses 3a and 3b are laid on the non-powered vehicle 1. That is, in the railway vehicle system according to the first embodiment, because the second control line 3e and the DC buses 3a and 3b are, laid over the entire vehicle, the non-powered vehicle 1 not mounted with the power storage device 12 can be included in a part of the vehicles constituting the train. Therefore, the coupling position and the coupling order of the non-powered vehicles do not need to be taken into consideration at the time of composing a train.

The variations described above are whether to mount the power storage device on the non-powered vehicle. However, there are various variations regarding an arrangement position of the DC/DC converter and the configuration of the power conversion unit. FIGS. 3 to 6 show examples thereof.

Figure 3:
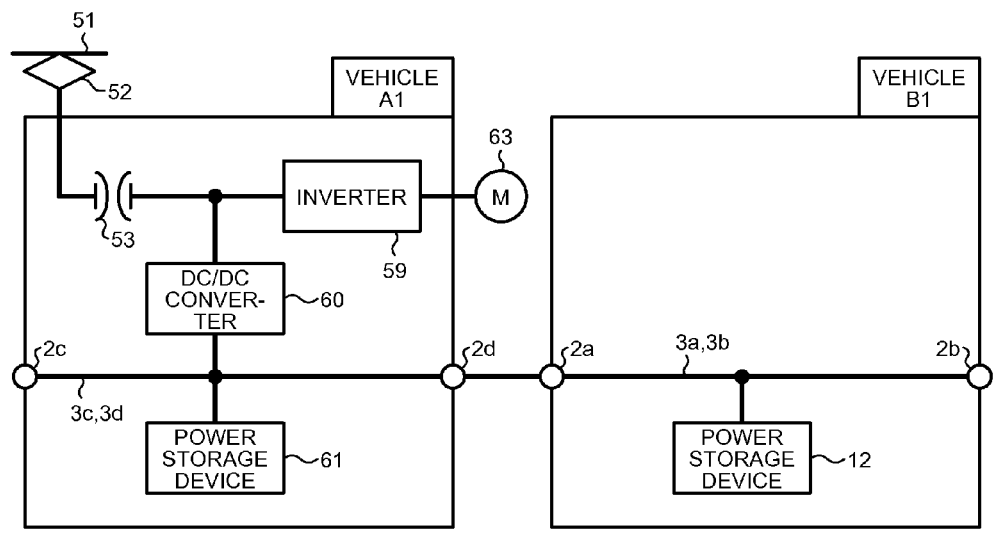
FIG. 3 is an explanatory diagram of a variation regarding an arrangement position of a DC/DC converter in a configuration according to the first embodiment.
Figure 4:
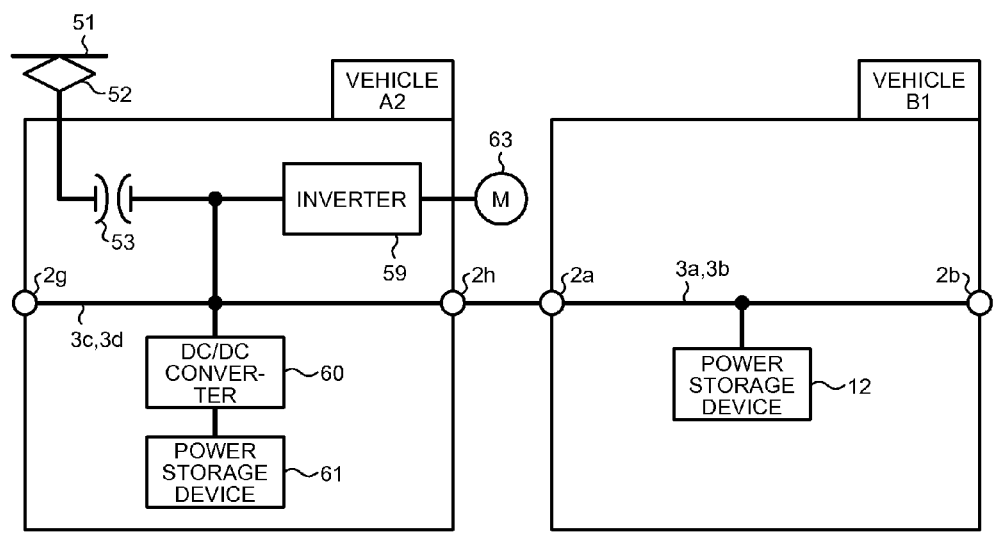
FIG. 4 is an explanatory diagram of another variation regarding the arrangement position of the DC/DC converter in the configuration according to the first embodiment.
Figure 5:
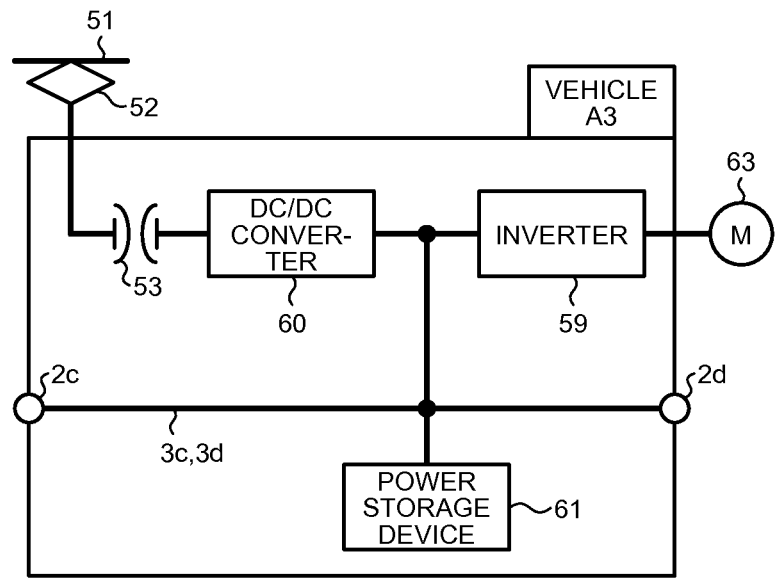
FIG. 5 is an explanatory diagram of a variation of a power conversion unit in the configuration according to the first embodiment.
Figure 6:
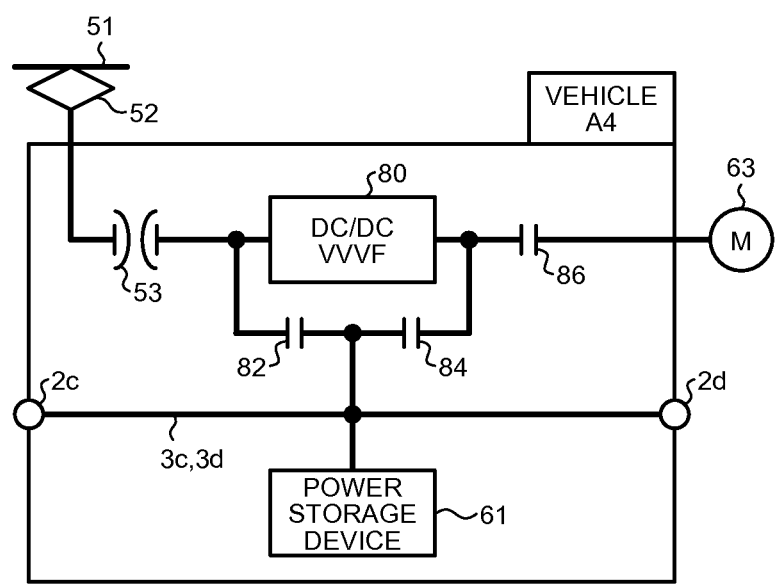
FIG. 6 is an explanatory diagram of another variation of the power conversion unit in the configuration according to the first embodiment.

FIG. 3 shows the configuration of the railway vehicle system shown in FIG. 1 in a simplified manner. In FIG. 3, the configuration of the electric locomotive 50 shown in FIG. 1 is identified as a vehicle A1, and the configuration of the non-powered vehicle 1 shown in FIG. 1 is identified as a vehicle B1. Regarding the configuration of the vehicle A1 shown in FIG. 3, it can be configured as a vehicle A2 shown in FIG. 4 in which the DC/DC converter 60 is connected between the DC buses 3c and 3d and the vehicle A2, or can be configured as a vehicle A3 shown in FIG. 5 in which the DC/DC converter 60 is connected between a connection terminal with the power storage device 61 and the circuit breaker 53 on an input side of the inverter 59. Furthermore, as shown in FIG. 6, a power conversion unit (DC/DC converter, VVVF) 80 having both functions of the DC/DC converter 60 and the inverter 59 can be configured such that the power storage device 61 is connected to a terminal on the overhead contact line side of the power conversion unit 80 via a first contactor 82, connected to a terminal on the drive motor side of the power conversion unit 80 via a second contactor 84, and connected to the drive motor 63 via a third contactor 86.

As explained above, according to the railway vehicle system of the first embodiment, abnormality of the power storage device and the respective battery modules constituting the power storage device is determined, and control is executed to cut off from the DC buses the power storage device having the detected abnormality and the power storage device including the battery modules having the detected abnormality, which avoids deterioration of the characteristics of other normal power storage devices due to an influence of the deteriorated power storage device. As a result, power storage devices having different characteristics can be used in a train in one formation, and limitations in the train formation can be alleviated.

According to the railway vehicle system of the first embodiment, the power storage device can be mounted on the non-powered vehicle, and the power storage device having a sufficient capacity as a train for power running of the train and/or for absorbing regenerative power can be mounted. Therefore, even when a trolley voltage is high and regenerative power cannot be returned to the overhead contact line, the power storage device can be charged to a sufficient capacity, and power at the time of regeneration does not need to be consumed by the resistors or the like, which achieves an energy-saving effect. A usage rate of a mechanical brake can be decreased, and abrasion of a brake shoe can be suppressed, which achieves cost reduction as well as reduction of maintenance.

Second Embodiment

Figure 7:
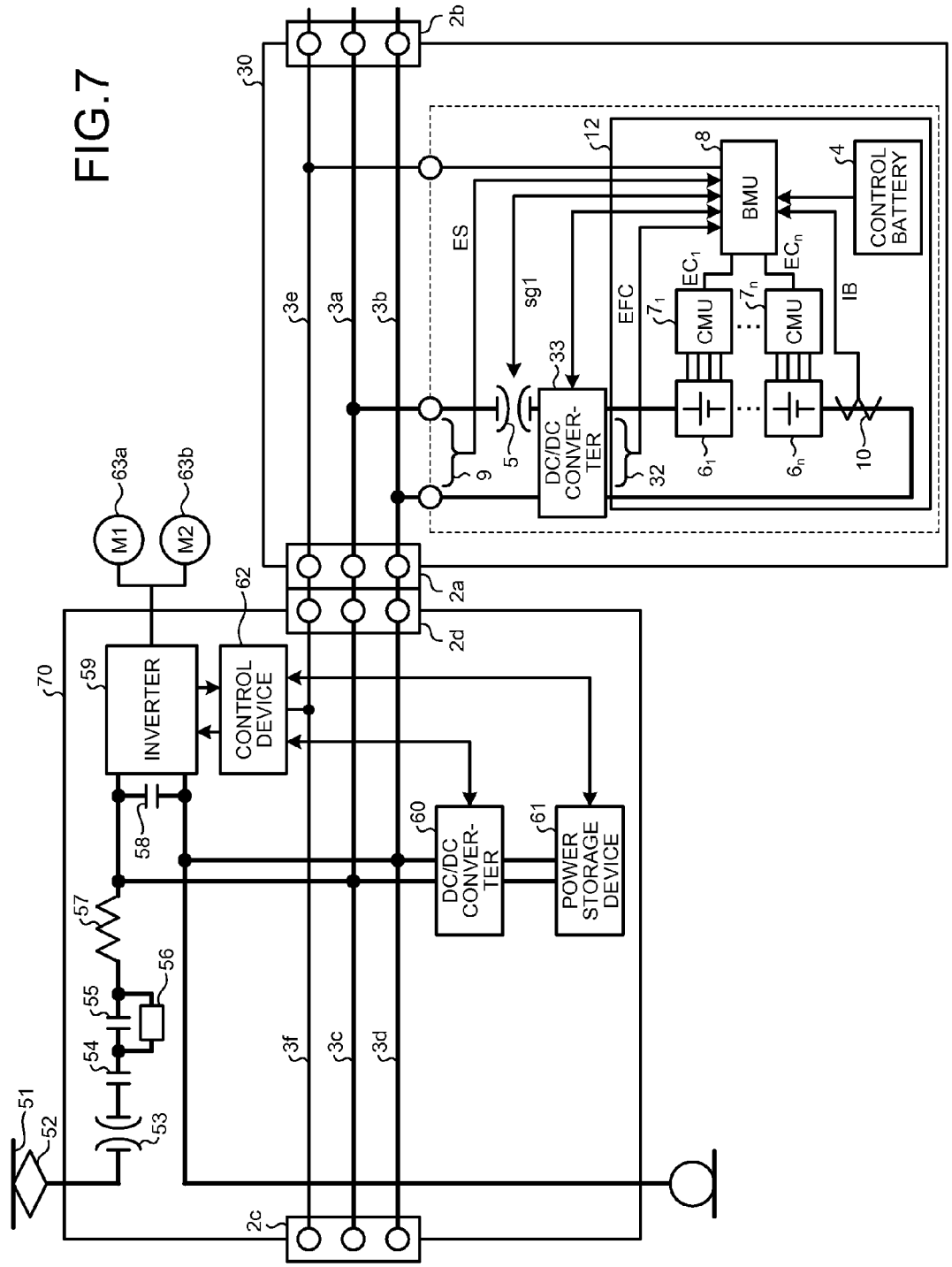
FIG. 7 shows a configuration example of a railway vehicle system according to a second embodiment.

FIG. 7 shows a configuration example of a railway vehicle system according to a second embodiment. The railway vehicle system according to the second embodiment is different from the railway vehicle system according to the first embodiment in that the arrangement position of the first DC/DC converter (the DC/DC converter 60) in the electric locomotive 50 is different, and a DC/DC converter (second DC/DC converter) different from the first DC/DC converter is also provided in the non-powered vehicle 1. More specifically, according to the second embodiment, the power storage device 61 is connected between the DC buses 3c and 3d via the DC/DC converter 60 in the electric locomotive 50. Furthermore, according to the second embodiment, in the non-powered vehicle 1, the power storage device 12 is connected between the DC buses 3a and 3b via a DC/DC converter 33 as the second DC/DC converter. According to this configuration, a voltage detector 32 that detects a voltage of an output terminal on the power storage device 12 side in the DC/DC converter 33 is provided. Other configurations are identical or equivalent to those according to the first embodiment shown in FIG. 1, and are denoted by like reference signs and redundant explanations will be omitted.

An operation of important parts (particularly, an operation of a different part from the first embodiment) of the railway vehicle system according to the second embodiment is explained next.

When the power storage device 12 can be connected between the DC buses 3a and 3b, the command signal sg1 for turning on the circuit breaker 5 is sent from the BMU 8 based on an instruction from the control device 62. Determination as to whether the power storage device 12 can be connected between the DC buses 3a and 3b is performed by, for example, the BMU 8, and a determination result thereof is notified to the control device 62. Various pieces of information transmitted to the BMU 8 can be notified to the control device 62 so that the BMU 8 does not perform the determination but the control device 62 performs the determination. When the circuit breaker 5 is turned on, the power storage device 12 is electrically connected between the DC buses 3a and 3b.

The DC/DC converter 60 charges the power storage device 61 by using DC power from the DC overhead-contact line 51 or regenerative power from the drive motor 63. The DC/DC converter 60 discharges DC power of the power storage device 61 and supplies the DC power to the inverter 59 in order to drive the drive motor 63. The inverter 59 converts the supplied DC power to AC power to drive the drive motor 63, and applies a drive force to the electric locomotive 50.

The DC/DC converter 33 also charges the power storage device 12 by using DC power from the DC overhead-contact line 51 or regenerative power from the drive motor 63. The DC/DC converter 33 discharges DC power of the power storage device 12 and supplies the DC power to between the DC buses 3a and 3b. The charge and discharge current IB of the power storage device 12 is controlled based on a detection voltage ES of the first voltage detector 9, a detection voltage EFC of the second voltage detector 32, and the information from the BMU 8.

Figure 8:
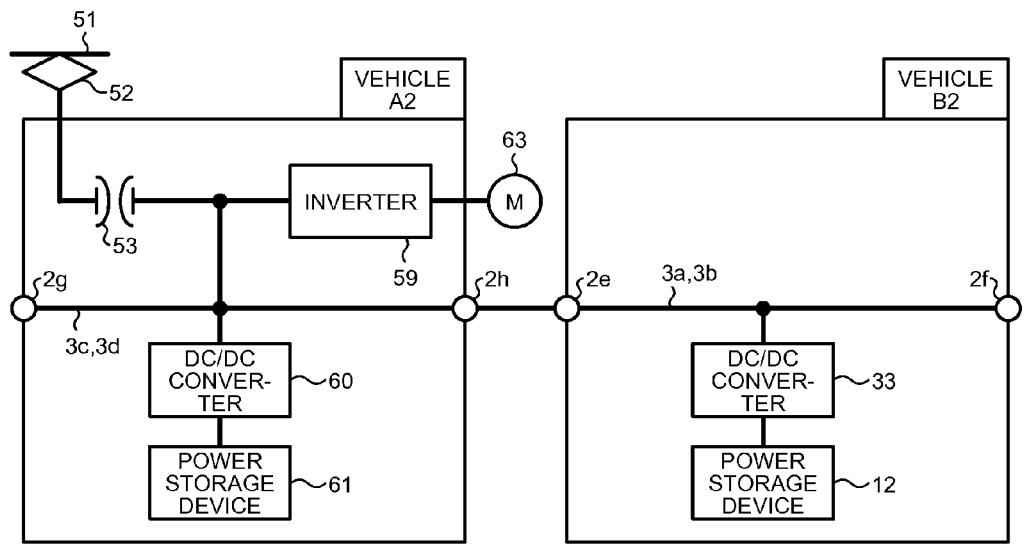
FIG. 8 is an explanatory diagram of a variation regarding an arrangement position of a DC/DC converter in a configuration according to the second embodiment.
Figure 9:
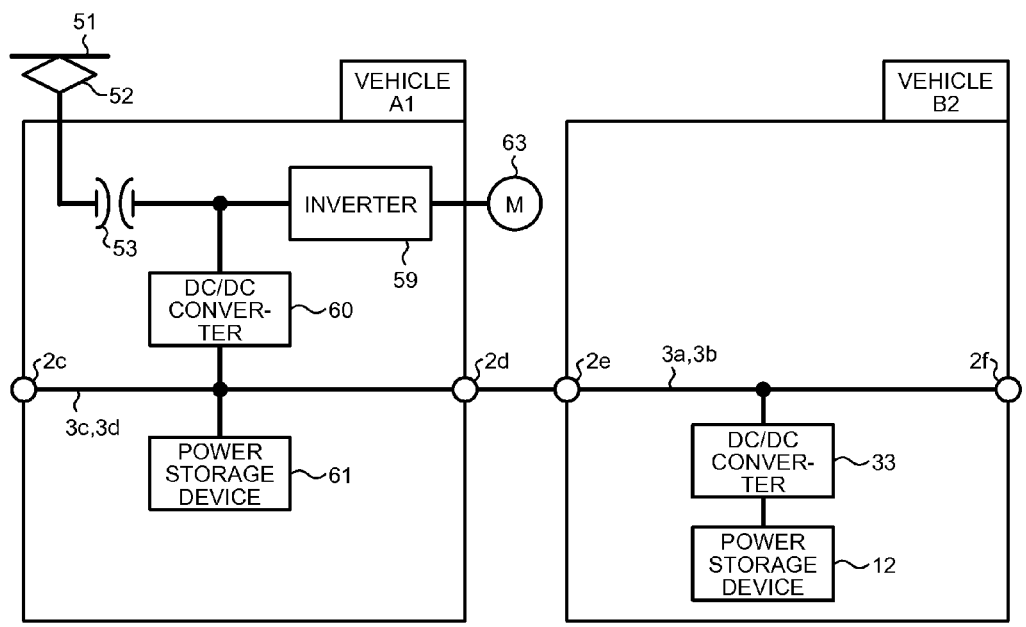
FIG. 9 is an explanatory diagram of another variation regarding the arrangement position of the DC/DC converter in the configuration according to the second embodiment.

In the railway vehicle system according to the second embodiment, there are various variations regarding the vehicle configuration as in the first embodiment. FIGS. 8 and 9 show examples thereof.

FIG. 8 shows a configuration of the railway vehicle system shown in FIG. 7 in a simplified manner. In FIG. 8, the configuration of the electric locomotive 50 shown in FIG. 7 is identified as a vehicle A2 (also shown in FIG. 4), and the configuration of the non-powered vehicle 1 shown in FIG. 7 is identified as a vehicle B2. Regarding the configuration of the vehicle A2 shown in FIG. 8, it can be configured as a vehicle A1 (also shown in FIG. 3), as shown in FIG. 9, in which the DC/DC converter 60 is connected between the DC buses 3c and 3d and the vehicle A2. Regarding the configuration of the electric locomotive 50, the configurations of the vehicle A3 (FIG. 5) and the vehicle A4 (FIG. 6) shown above can be adopted other than these configurations.

As explained above, according to the railway vehicle system according to the second embodiment, in the power storage devices mounted on the respective non-powered vehicles, the charge and discharge current is individually controlled by the DC/DC converter mounted on the non-powered vehicle. Therefore, power storage devices having different characteristics can be used in a train in one formation. Accordingly, in addition to the effect of the first embodiment, a train can be composed without unifying the characteristics of the respective battery modules constituting the power storage device, thereby enabling to increase the flexibility of train formation.

As in the railway vehicle system described in Patent Literature 1 mentioned above, when a function of individually controlling charge and discharge with respect to the power storage device is not provided, when there is a variability due to an individual difference at the time of manufacturing the power storage device or due to a characteristics change because of aged deterioration, charge and discharge control according to a power storage device having the worst characteristics is executed. Accordingly, performance of the power storage device may be decreased. On the other hand, in the railway vehicle system according to the second embodiment, because the function of individually controlling charge and discharge with respect to the power storage device is provided, even when power storage devices having different characteristics are used in a train in one formation, the difference in the characteristics between the power storage devices can be absorbed by the DC/DC converter.

In the first and second embodiments described above, a DC electric locomotive that travels under a DC overhead contact line has been explained. However, an AC electric locomotive that travels under an AC overhead contact line, a diesel locomotive that is not an electric locomotive, a diesel hybrid locomotive, or the like can also be used. In the above explanations of the first and second embodiments, a freight vehicle is assumed as the non-powered vehicle. However, the non-powered vehicle can be a passenger vehicle other than a freight vehicle. The power storage device does not need to be mounted on the non-powered vehicle.

INDUSTRIAL APPLICABILITY

As described above, the present invention is useful as a railway vehicle system applicable to an AC/DC multi power supply of various types.

REFERENCE SIGNS LIST 1 non-powered vehicle
2, 2a to 2d coupler
3a, 3b DC bus (second power wiring line)
3c, 3d DC bus (first power wiring line)
3e second control line
3f first control line
4 control battery
5, 53 circuit breaker
6, 6a, 6n, battery module
7, 7a, 7n CMU (cell monitor unit)
8 BMU (battery management unit)
9, 32 voltage detector
10 current detector
12 power storage device (second power storage device)

24 cargo
26 carriage platform
33 DC/DC converter (second DC/DC converter)
50 electric locomotive
51 DC overhead-contact line
52 pantograph
54 first line breaker
55 second line breaker
56 charging resistor
57 filter reactor
58 filter capacitor
59 inverter
60 DC/DC converter (first DC/DC converter)
61 power storage device (first power storage device)
62 control device
63, 63a, 63b drive motor
80 power conversion unit (DC/DC converter, VVVF)
82 first contactor
84 second contactor
86 third contactor

The invention claimed is:

1. A railway vehicle system comprising:
at least one powered vehicle having a drive motor, including:
  first power lines having positive and negative DC terminals and laid between one coupler and the other coupler, the couplers being provided at each end of each powered vehicle;
  a first power storage device connected to the first power lines via a first circuit breaker;
  a first battery management unit that is provided for each first power storage device, manages the first power storage device, and individually controls the first circuit breaker; and
  a first DC/DC converter that is connected between the first circuit breaker and the first power storage device, individually executes charge and discharge control with respect to the first power storage device, and absorbs a difference in characteristics between the first power storage device and other power storage devices; and
at least one non-powered vehicle including:
  second power lines connected to the first power lines via the coupler;
  a second power storage device connected to the second power lines via a second circuit breaker;
  a second battery management unit that is provided for each second power storage device, manages the second power storage device, and individually controls the second circuit breaker; and
  a second DC/DC converter that is connected between the second circuit breaker and the second power storage device, individually executes charge and discharge control with respect to the second power storage device, and absorbs a difference in characteristics between the second power storage device and other power storage devices,
wherein the first battery management unit detects and compares a voltage between the first power lines and a total voltage of the first power storage device, determines, when a difference between the voltage between the first power lines and the total voltage of the first power storage device is within a predetermined value, that the first power storage device can be connected between the first power lines to control the first circuit breaker to be turned on, and when abnormality of the first power storage device is detected, controls the first circuit breaker to be turned off, thereby cutting off electrical connection between the first power storage device and the first power lines, and
wherein the second battery management unit detects and compares a voltage between the second power lines and a total voltage of the second power storage device, determines, when a difference between the voltage between the second power lines and the total voltage of the second power storage device is within a predetermined value, that the second power storage device can be connected between the second power lines to control the second circuit breaker to be turned on, and when abnormality of the second power storage device is detected, controls the second circuit breaker to be turned off, thereby cutting off electrical connection between the second power storage device and the second power lines.

2. The railway vehicle system according to claim 1, wherein the first battery management unit detects abnormality of the first power storage device based on information on a temperature, a charged state, and a deteriorated state of a battery module constituting the first power storage device, and the second battery management unit detects abnormality of the second power storage device based on information on a temperature, a charged state, and a deteriorated state of a battery module constituting the second power storage device.

3. A non-powered vehicle applied to the railway vehicle system according to claim 1, wherein although second power lines connected to the first power lines via the coupler and a control line connected via the coupler are laid, the second power storage device is not mounted.

* * * * *